United States Patent [19]

Niven

[11] Patent Number: 4,672,175
[45] Date of Patent: Jun. 9, 1987

[54] ARC STARTER FOR WELDER

[75] Inventor: Robert W. Niven, Lilburn, Ga.

[73] Assignee: Hy-Tek Systems, Inc., Atlanta, Ga.

[21] Appl. No.: 743,110

[22] Filed: Jun. 10, 1985

[51] Int. Cl.$^4$ .............................................. B23K 9/06
[52] U.S. Cl. ................................. 219/130.4; 219/136;
219/137 PS
[58] Field of Search .............. 219/130.4, 136, 137 PS

[56] References Cited

U.S. PATENT DOCUMENTS 3,444,430 5/1969 Needham ........................ 219/130.4
3,571,558 3/1971 Hogan, Jr. ...................... 219/130.4

Primary Examiner—Clifford C. Shaw
Attorney, Agent, or Firm—Jones & Askew

[57] ABSTRACT

An improved non-contact type arc starter for a welding apparatus is disclosed. A diode (25) is reversed biased when a high output DC voltage is provided by a power supply (26). When the arc is struck, the diode becomes forward biased allowing arc current to flow. The striking of the arc is detected by the dropping out of a relay coil (60) which in turn closes a contact set activating a solenoid coil (65). The solenoid coil (65) is part of a contactor having contact set (32) which closes, shunting the diode. This prevents the diode from carrying full welding current for more than several hundred milliseconds maintaining the junction temperature of the diode at a low value and allowing immediate restart after the arc is extinguished.

10 Claims, 3 Drawing Figures

ARC STARTER FOR WELDER

TECHNICAL FIELD

The present invention relates to arc starters for welding machinery and in particular discloses an improved arc starter usable with both AC and DC welding power supplies which requires virtually no recovery time between extinguishment of the arc and restart irrespective of the time welding current has been drawn during the existence of the most recent arc.

BACKGROUND OF THE INVENTION

In many welding applications, it is necessary to start the arc between a welding torch or electrode and the workpiece without bringing the electrode into contact with, or very close proximity to, the workpiece. This is true in many applications with stringent requirements for high quality welds such as the joining of pipes, boiler tubes and the like in nuclear power plants. Many such precision jobs include specifications which preclude the starting of a weld by bringing the current carrying electrode element substantially into contact with the workpiece. When an arc is started by contact or near contact with the workpiece, the initial arc current is very high and can damage the structural integrity of the workpiece. Hence the requirement in precision welding jobs for non-contact arc starting.

Most such requirements are welding jobs requiring the use of tungsten inert gas (TIG) welding apparatus. However, while metal inert gas (MIG) welding machines are not as commonly used in critical welding applications, it is still desirable in some situations to avoid advancing the consumable wire/electrode of a MIG welding apparatus to the point where it contacts the workpiece in order to strike an arc.

Therefore, prior art machines have been created for starting the arc without electrode/workpiece contact. The essential nature of the arc in an arc welding device is a path of ionized gas between the active electrode and the workpiece, which ionized gas conducts the welding current. It is well known that a very intense electric field must be created between the active electrode or torch and the workpiece to initially ionize the gas and start the arc. Since this must be done with a relatively large distance between the torch and workpiece, the electric field intensity can only be increased by significantly raising the potential difference between the torch and the workpiece.

Most prior art non-contact arc starters have created the necessary potential difference between torch and workpiece by exciting a tuned circuit with a voltage function approximating the mathematical impulse function. This causes the tuned circuit to ring and provide a high voltage oscillatory output. By the nature of the construction of such circuits, they have been physically located physically within or closely adjacent to the welding power supply itself. This is because of the pulse spreading which results from the inability of the welding cable extending from the power supply to the torch to accurately transmit the high frequency components of such an impulse like signal. At the frequencies present in the output of such arc starters, the transmission line effects of the cabling between the welding power supply and the torch become predominant. Thus, the length of cable through which such arc starters can transmit the necessary high voltage to strike an arc is limited. Experience has shown that the length of cable between power supply and torch which causes problems with operating this type of arc starter is shorter than the length at which the resistivity of such cabling begins to cause excessive losses in the cable once the arc is struck.

An additional drawback with this type of prior art arc starter is the fact that, because of its nature, it produces a large amount of radiated radio frequency noise. This noise is transmitted both through the air and through power supply connections among components within the welding power supply. Many modern power supplies depend to a great extent on TTL and other logic circuits for their operation. It is well known to those skilled in the art that the presence of air-borne radio frequency noise of significant any intensity and RF noise on the power supply connections in circuits using this type of device can cause erratic, and potentially destructive, behavior in such circuits.

It is the belief of the inventor of the present invention that at least one arc starter constructed by a competitor of the inventor's assignee has employed a high voltage DC power supply which may be operated to produce a large voltage drop between the torch electrode and a grounded workpiece. The inventor recognizes this as work of another but the description of this device in the background of the invention is not to be taken as a stipulation that such apparatus is necessarily prior art to the present invention.

As best the inventor understands it, this device includes a high current switching diode in series between an active output terminal of the welding power supply, to which the welding torch is normally connected, and a torch connection terminal at the output of the arc starter. The diode is connected so that it is forward biased in the presence of normal welding current through an existing arc, and thus the diode conducts the full welding current once an arc is struck.

A connection of an intermittently operated high voltage power supply is made to the terminal of the diode which causes it to become back-biased when the high voltage signal is applied. Once the arc is struck in response to the intense electric field created by the high voltage power supply, the very low impedance of the welding power supply output and the arc predominate, and the diode becomes forward biased and begins conducting welding current.

The major drawbacks with this type of arc starter are two-fold. First, this type of circuit requires that the diode used in the arc starter conduct the full welding current at all times that welding is taking place. Since high current switching diodes are very expensive devices, this increases the cost of such an arc starter. Since the diode in this circuit must conduct the full welding current, it also increases the probability of failure of the diode.

The operation of this type of diode near its rated current carrying capacity causes the device to be operated near its maximum acceptable junction temperature. Even with the relatively low voltage drop of a forward biased diode, such a device dissipates a considerable amount of heat. Experience has shown that once an arc is extinguished after the diode has been operated near its maximum junction temperature, attempts to restart the arc by reapplication of the high voltage DC signal to one terminal of the diode normally fail until the diode has had sufficient time to cool.

The mechanism which causes this undesirable result is the fact that reverse leakage current in a semiconductor diode increases with junction temperature. The necessary geometry of the junction for such high current devices is such that when they are heated to a point near their maximum rated junction temperature, large leakage currents will flow in the presence of reverse bias. This has the effect of severely diminishing the diode's effectiveness as an ideal diode circuit element. This is particularly true in an arc starter of the type described, since it is normally necessary to apply a voltage to the torch/workpiece gap which exceeds the reverse breakdown voltage of a typical high current switching diode. Therefore, when a reverse bias greater than $V_{br}$ is applied to a hot diode, very large leakage currents will flow.

In practice, the reverse leakage currents can be so high that the diode no longer effectively "disconnects" the active output terminal of the welding power supply from the point in the circuit at which the high voltage arc starting power supply is connected to one terminal of the diode. This leads to a result in which the high voltage arc starting power supply effectively sees the very low output impedance of the welding power supply in parallel with the impedance which exists between the torch and the workpiece (which is very high in the absence of an arc) and the arc will not start.

Therefore, experience has shown that one using such an arc starter must allow sufficient time, often on the order of five to ten minutes, for the diode of this type of arc starter to cool before an arc can be restarted. This naturally leads to inefficient use of the welding apparatus and the time of the people operating it. This situation in turn translates to increased cost of the welding job, which often finds its way to increased public utility rates in many of the applications for which non-contact arc starters are required.

In summary, the first type of non-contact arc starter described above does not have the problem of a time lag between extinguishing of the arc and the ability of the starter to restart it. Its main drawbacks are the large amount of RF noise such a device produces and the restrictions its use places on the length of the cabling between the welding power supply and the torch. On the other hand, the second type of non-contact arc starter described above overcomes the two main disadvantages of the first type, but has the above-described problems of failure to restart until diode cooling takes place after the arc is extinguished.

Therefore, there is a need in the welding art for a non-contact type arc starter which provides the beneficial results obtained from both types of prior art type arc starters described hereinabove. Furthermore, there is a need in the welding art to provide such an arc starter which will operate dependably with either a DC welding power supply or an AC welding power supply.

SUMMARY OF THE PRESENT INVENTION

The present invention provides a non-contact type arc starter which fulfills the above-described need. Generally described, the present invention is similar to the second type of arc starter described above, in that it employs a similarly arranged diode between the active output terminal from a welding power supply and an arc starter output terminal for the welding torch. The present invention also includes a selectively operable high voltage DC power supply to create the necessary electric field intensity between the torch and the workpiece to strike the arc.

The present invention overcomes the drawbacks of the prior art by also including apparatus which detects the striking of the arc. A shunt of sufficient current carrying capacity to handle the full welding current is placed across the diode in response to detection of the arc. With this combination, the diode needs to conduct the full arc current only for the time between the detection of arc strike by the arc detection apparatus and the time that the shunt across the diode becomes fully operational. In practical embodiments of the present invention, the maximum length of this time is on the order of several hundred milliseconds. Therefore, this improvement to the art of non-contact arc starters provides an arc starter in which the high current switching diode carries full arc current only for very limited duty cycles only at the time the arc is initiated. This greatly reduces stress on the diode and the probability of failure of a diode device, one of the most expensive parts of the arc starter.

In preferred forms of the present invention, the shunt referred to above is the high current contacts of a solenoid switch or contactor. In a preferred form of the present invention the arc detection apparatus includes a relay connected between the grounded terminal and the active output terminal from the power supply. This relay is preferably interconnected with another voltage dropping device such as a resistor or zener diode so that the arc may be detected by detection of the drop in the voltage between torch and workpiece which occurs when the arc is struck. With this arrangement, the coil of the relay becomes starved for sufficient current to keep the relay pulled in once the arc is struck, and the relay will drop off. One contact set of the relay controls the coil of the solenoid which, in turn, causes the contacts of the solenoid switch to close in response to detection of the arc being struck.

The inventor of the present invention has recognized the mechanism causing the problem in prior art non-contact arc starters employing diodes and high voltage DC power supplies. The inventor has further recognized that in order to shunt a diode connected in this fashion, it is necessary to provide a selectively operable shunting device which can carry the entire welding current and not be destroyed. Also, the shunt device must not break down in the preence of the high voltage output from the high voltage DC arc starting supply, since substantially all of this voltage will appear between the terminals of the shunting device until the arc is struck.

Therefore, in the preferred form of the present invention employing a solenoid operated switch, it will be appreciated that the solenoid switch has two necessary characteristics. First, the contacts must be constructed so that they can conduct the full welding current while welding is taking place. Secondly, the contacts must be physically configured when they are open such that the electric field intensity between the contacts in the presence of the high voltage output will be insufficient to ionize the air between the contacts, thus causing an arc to be struck between the contacts rather than between the torch and the workpiece.

Therefore, it is an object of the present invention to provide an improved non-contact type arc starter which overcomes the above-cited drawbacks of the prior art. More specifically, it is an object of the present invention to provide an arc starter which may be located at any location between the welding power supply and the torch which is convenient to the welding job at hand, and wherein the normal considerations of losses in the cabling carrying the arc current are the only factors which limit the length of such cabling.

It is a further object of the present invention to provide an improved non-contact arc starter which does not produce high intensity bursts of radio frequency noise which disrupts the logic circuits of many modern welding power supplies. It is still a further object of the present invention to provide an improved arc starter which will operate reliably with either an AC or DC output welding power supply.

That the present invention achieves these objects and overcomes the above-noted drawbacks of the prior art will be appreciated from the following detailed description of the preferred embodiment.

DETAILED DESCRIPTION

Figure 1:
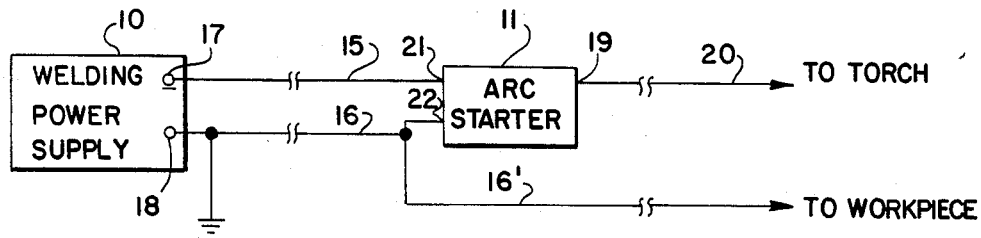
FIG. 1 is a block diagram showing the environment in which the present invention is used.

Turning to the drawing figures in which like numerals reference like parts, the environment, construction, and operation of the preferred embodiment will now be described.

FIG. 1 shows a typical embodiment of the present invention. A welding power supply 10 is connected to an arc starter 11 embodying the present invention via cables 15 and 16. Cable 15 is connected to the active output terminal 17 while conductor 16 is connected to grounded output terminal 18 of power supply 10. Typically, a power supply 10 which would be used with the present invention has an open circuit voltage of −80 volts between grounded terminal 18 and active output terminal 17.

It should be understood that the designation active output terminal refers to the normal negative output terminal of a welding power supply, but is not so limited. This term could just as easily refer to a positive output terminal, were one employed in power supply 10. Similarly, if output terminal 17 produces a bipolar AC voltage with respect to grounded terminal 18, the nature of the present invention is not changed.

Cables 15 and 16 are broken in FIG. 1 to indicate that arc starter 11 may be placed an arbitrary distance from power supply 10, limited only by the normal considerations limiting the length of such cabling irrespective of whether an arc starter is used. A torch connection terminal 19 is connected to conductor 20 which carries welding current to the torch once the arc is struck. Similarly, lines 15 and 16 connect to input terminals 21 and 22 of arc starter 11. An extension of line 16 is shown as 16' and represents the connector grounding the workpiece.

Cables 16' and 20 are also shown as broken to indicate the arbitrary placement of arc starter 11 in the cabling between power supply 10 and the torch and the workpiece (not shown).

Figure 2:
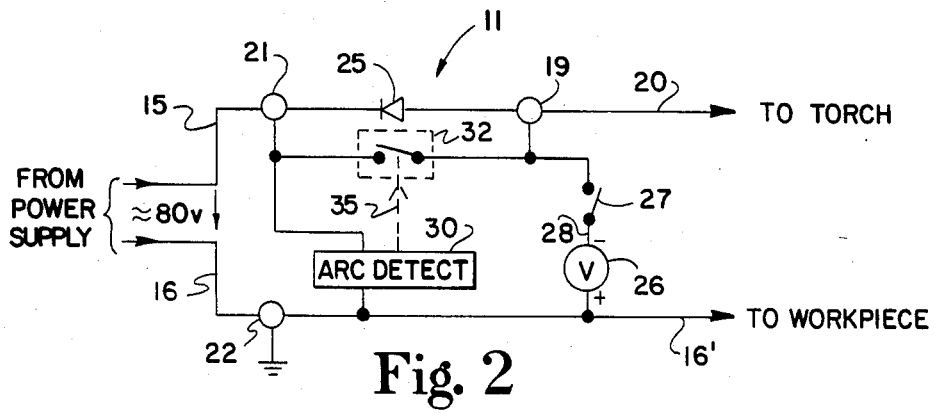
FIG. 2 is a block diagram of the present invention.

FIG. 2 shows a block diagram of the present invention. All of the terminals and interconnecting conductors are referenced with the same numerals as they are in FIG. 1. As shown in FIG. 2, the voltage from the active output terminal 17 of power supply 10 is typically −80 volts with respect to ground. Between terminals 19 and 21, a diode 25 is connected. Since the current in the presence of an arc will flow between lines 16' and 20 (through the arc), it will be appreciated that diode 25 is interconnected so that it will be forward biased in the presence of an arc and thus will conduct welding current. A high voltage DC power supply 26 may be selectively connected between ground and torch connection terminal 19 through the operation of a switch shown as 27. The polarity represented by voltage source 26 indicates that its output on line 28 is negative with respect to ground in the preferred embodiment.

It should be understood that switch 27 is shown as actually connecting the output of voltage source 26 to terminal 19 but this representation has been made only to show that some form of operator controllable input device is provided to selectively connect the output of the high voltage DC voltage source to the torch connection terminal 19.

Connected between terminals 21 and 22, and thus shunting the output terminals of power supply 10, is arc detector 30. The preferred embodiment of arc detector 30 is discussed in connection with FIG. 3. Suffice it to say in connection with FIG. 2 that this device detects the striking of the arc by detection of any parameter which changes significantly in the presence of the high welding current which appears once an arc is struck.

In the preferred embodiment, arc detector 30 detects the voltage drop between terminals 21 and 22 in the presence of welding current. However, any alternate arrangement which detects the striking of the arc may embody arc detector 30.

Connected between terminals 19 and 21, in parallel with the terminals of diode 25, is a shunting switch shown as 32. Switch 32 is operated in response to a signal output by arc detector 30 as indicated by dashed line 35 in FIG. 2. The shunting switch 32 closes in response to detection of the arc and thus shunts welding current flowing through conductors 15 and 20 around diode 25.

As noted above, this only requires diode 25 to carry full welding current for the time period between the striking of the arc and the activation of shunting switch 32. Therefore, it will be appreciated that switch 32 constitutes a shunting means for shunting diode 25 and carrying arc current in response to an arc signal represented by dashed line 35 output by arc detector 30.

The operation of the present invention will now be described in connection with FIG. 2. In order to activate the arc starter, the user closes contact 27 which supplies a high voltage negative DC signal from line 28 through terminal 19 onto conductor 20, which therefore places this high voltage between the torch and the workpiece. In the preferred embodiment, the output on line 28 is approximately −3000 volts. Since terminal 21 is maintained at approximately −80 volts, it will be appreciated that diode 25 is indeed reversed biased under these conditions.

When the arc is struck, current begins to flow from line 16' through line 20. In a typical welding environment, argon gas will be used as the shielding gas and thus ionized argon gas will constitute the arc appearing between the torch and the workpiece (not shown). Under these typical conditions, the drop of approximately 20 volts will appear across the arc. Therefore, when the arc is struck, terminal 19 will be at a potential on the order of −20 volts and the power supply will be trying to hold line 15 at approximately 80 volts and therefore diode 25 becomes forward biased and begins conducting welding current.

The drop in voltage is detected by arc detector 30 which activates shunting contacts 32 shunting welding current through the closed switch around diode 25. This provides the above-described benefits of requiring diode 25 to carry full welding current only for a very brief period of time. This arrangement in turn prevents the heating of the junction of diode 25 to its maximum operating temperature. This provides an arc starter which may dependably restart an arc many times in succession without requiring any time delay for diode 25 to cool.

Figure 3:
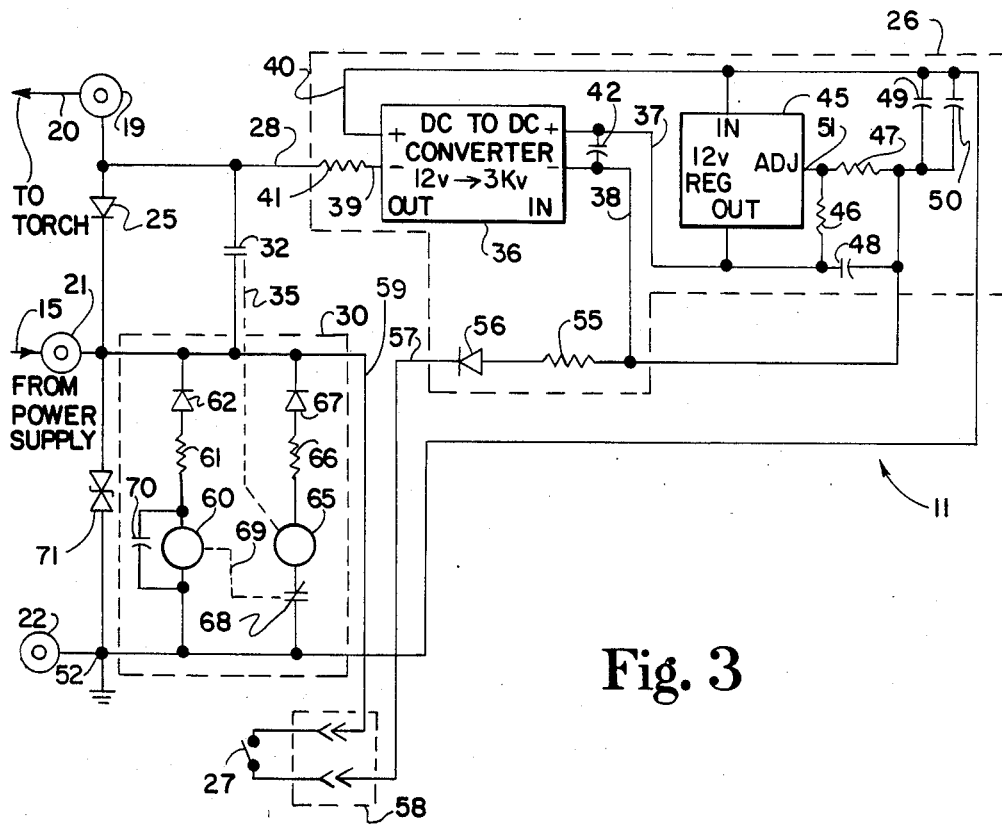
FIG. 3 is a schematic diagram of the preferred embodiment of the present invention.

Turning next to FIG. 3, a detailed circuit schematic of the preferred embodiment is shown. As noted above, all elements referenced in FIGS. 1 and 2 are referenced with identical numerals in FIG. 3. The components constituting the high voltage power supply 26 are shown within dashed line 26 on FIG. 3. The main component of high voltage power supply 26 is a 12-volt to 3 KV DC to DC converter 36. This may be embodied by such a converter of the type currently manufactured by Wall as its Model H30 DC to DC converter. This device accepts a 12-volt input between lines 37 and 38 and puts out a 3000-volt output between lines 39 and 40.

A current limiting 1K, 2 watt resistor 41 is connected between line 39 and line 28 which connects the output of power supply 26 to torch connection terminal 19. A filter capacitor 42 is connected across lines 37 and 38 in a standard arrangement.

The input to converter 36 is derived from an integrated circuit 12-volt regulator 45. This may be embodied by one of many such devices, such as the TL-783C currently manufactured by Texas Instruments. Resistors 46 and 47 and capacitors 48-50 filter the input voltage to regulator 45 and provide the proper adjusting voltage at input 51 to the regulator. Selection of values for these devices is known to those skilled in the art and described in detail in literature available from the manufacturers of such regulators.

The output on line 39 is −3000 volts referenced to ground since the positive output terminal of DC to DC converter 36 is grounded through line 40 at point 52. A 15-ohm 30-watt resistor 55 provides a voltage drop between the welding power supply voltage present at point 21 and the input to regulator 45, and also helps isolate high voltage power supply 26 from the welding circuit. A diode 56 is included which serves as a rectifier in the event the preferred embodiment is used with an AC output welding supply.

The negative input to power supply 26 is provided on line 57. Therefore, lines 57 and 40 are connected to switch 27 by plug connector 58. It is noted that switch 27 simply connects the output of the welding power supply voltage which appears on line 59 to the negative input to power supply 26 on line 57, rather than actually connecting the output of the supply 26 to terminal 19 as shown on the block diagram of FIG. 2. Either arrangement will work, but it is naturally preferred to provide power to the circuitry of high voltage power supply 26 only when it is necessary to start an arc.

The components comprising arc detector 30 are surrounded by dashed line 30 on FIG. 3. As shown in FIG. 3, the preferred embodiment for the arc detector comprises two parallel circuits extending between grounded terminal 22 and active power supply output terminal 21. One leg of this circuit comprises relay coils 60, resistor 61, and diode 62. The other leg includes solenoid coil 65, resistor 66, diode 67 and normally-closed contact set 68 associated with relay coil 60. The fact that coil 60 activates contact 68 is represented by dashed line 69 in FIG. 3. A snubbing capacitor 70 is provided around coil 60. The preferred embodiment also employs a surge suppressor 71.

In the preferred embodiment, resistor 61 is a 1-kilohm 10-watt resistor and coil 60 of the relay is rated operate at 24-volts DC. Therefore, when no arc is present, and approximately 80 volts appears between terminals 21 and 22, resistor 61 will drop approximately 56 volts with approximately 24 volts being present across coil 60. Therefore, coil 60 has a DC resistance on the order of 425 ohms and this branch will be carrying approximately 56 milliamperes. In the preferred embodiment, resistor 66 is a 20-ohm 25-watt resistor used to limit the current through solenoid coil 65. As shown by line 35, the activation of solenoid coil 65 operates solenoid contact set 32 to shunt diode 25. The combination of coil 65 and contact set 32 is preferably embodied by a Stancor type 124-902 contactor which will be well known to those skilled in the art.

The sequence of operation of the preferred embodiment is as follows. Assuming an initial condition in which the arc has not been struck, but the torch (not shown) has been brought into sufficient proximity with the workpiece so that the application of high voltage between the two will ionize the gas between the two allowing arc current to flow. The user operates switch 27 which applies power to high voltage power supply 26. In response to the application of power, DC to DC converter 36 tries to hold line 28 at approximately −3000 volts with respect to ground.

In the preferred embodiment, diode 25 is embodied by a General Electric type A187PE switching diode rated at 150 amps continuous current and a 1500 volt reverse break-down voltage. Since the output of DC to DC converter 36 considerably exceeds 1500 volts, it will be appreciated that diode 25 will in fact break down under the conditions described. However, as described hereinbelow, diode 25 will dependably be operating with a relatively cool junction temperature, and thus the reverse leakage current through the diode under these conditions is relatively nominal. The result of these two effects is to apply an open circuit voltage of approximately −1800 volts between terminals 19 and 22, the grounded terminal.

This voltage creates an electric field intensity, for a given distance between torch and workpiece, which is sufficient to ionize the gas and start the arc. When the arc is struck, arc current begins flowing from terminal 19 to terminal 21 through diode 25. As noted above, the arc voltage dominates under these circumstances, and thus the power supply 10 (FIG. 1) will be trying to hold line 15 at −80 volts and the arc will constrain terminal 19 to be at approximately −20 volts. Thus, diode 25 is indeed forward biased and conducts the arc current. It is noted that the combination of the output impedance of DC to DC converter 36 and resistor 41 limit the effect of power supply 26 on the circuit once the arc is struck. Since the circuitry of the output of power supply 10 and the arc represent very low impedances, DC to DC converter 36 can effectively be ignored once the arc has been struck. However, it is an excellent idea for the user to deactivate switch 27 once the arc has been struck.

When current begins to flow, terminal 21 will be at only a slightly lower potential than terminal 19, this slight diminution in potential being determined by the forward junction drop of diode 25. Therefore, the voltage between terminals 21 and 22 drops to something on the order of 21 or 22 volts when the arc has been struck.

Prior to the striking of the arc, relay coil 60 is activated and normally closed contact set 68 was open thus preventing current flow through solenoid coil 65. When the voltage between terminals 21 and 22 drops to approximately 22 volts, the current in the branch containing coil 60 drops to approximately 50 milliamps which is insufficient to keep the relay pulled in. Therefore, the relay having coil 60 drops out and normally closed contact pair 68 closes. It will therefore be appreciated that the closure of contact pair 68 constitutes an arc signal which is provided in response to the detection of an arc being struck between a torch connected to terminal 19 and a workpiece connected to grounded terminal 22.

When the relay drops off and contacts 68 close, current begins flowing through the branch containing solenoid coil 65 activating the solenoid coil. This in turn closes contact set 32. When contact set 32 closes, arc current flowing from terminal 19 to terminal 21 is shunted around diode 25 through the contact set back to the power supply.

Therefore, it is necessary to select resistor 66 so that the combination of this resistor and solenoid coil 65 maintain the solenoid in its active condition when the voltage between terminals 21 and 22 is on the order of 20 volts. Similarly, resistor 61 and coil 60 must be selected so that relay coil 60 pulls the relay in when the voltage between terminals 21 and 22 is on the order of 80 volts, and causes the relay to drop off when the voltage drops to a value on the order of 20 volts.

Diodes 62 and 67 rectify any AC components in the welding power supply output appearing between lines 21 and 22 and thus allow the preferred embodiment to be used with AC output welding power supply.

When the arc is extinguished, the voltage between points 21 and 22 again rises to approximately 80 volts. Under these conditions, coil 60 again becomes active pulling the relay in and opening contact pair 68. This in turn breaks the circuit containing solenoid coil 65 causing contacts 32 to separate. Thus, the above-described initial conditions are then reestablished. Since the combination of coil 65 and contacts 32 are embodied by a well-known contactor, it will be appreciated that the physical device embodying contacts 32 will include a spring-loaded arrangement (not shown) to insure that the contacts separate when coil 65 is deactivated.

From the foregoing description it will be understood that diodes 25 only needs to carry welding current between the time the arc is struck and the time that it takes relay 60 to drop off in response to the above-described voltage drop, the time required for sufficient current to build up (overcoming a large self inductance) in coil 65, plus the travel time it takes contact set 32 to physically close. As noted above, this is on the order of several hundred milliseconds. Therefore, diode 25 will not be able to reach its maximum junction temperature and excessive reverse leakage currents will not be present if the user immediately reactivates the arc starter.

As noted above, any apparatus which can detect the striking of the arc, be it voltage sensitive or current sensitive, may be used to embody arc detector 30 in embodiments of the present invention. Similarly, any device capable of shunting the current around diode 25 and carrying the full value of the welding current may embody the shunting means implementing by contact set 32. It is noted that such a device must meet the following constraints. When the shunt device is active, it must be able to carry the full welding current without failing. Similarly, when the shunt device is inactive, it must be of a nature so that it will not break down in response to the high output voltage on line 28 when power supply 26 is activated.

In the preferred embodiment, the contact set 32 is chosen so that the physical spacing between the contacts when coil 65 is inactive is such that the electric field intensity between the contacts when converter 36 is active is insufficient to ionize the air between the contacts. This prevents the arc from being struck between the contacts (probably damaging their current carrying capability) rather than between the torch and the workpiece as desired.

From the foregoing description of the preferred embodiment, it will be appreciated that the present invention indeed overcomes the drawbacks of the prior art and achieves the objects of the invention recited above. From this description, other embodiments will suggest themselves to those skilled in the art and therefore the scope of the present invention is to be limited only by the claims below.

I claim:

1. An improved arc starter for use with a welding power supply of the type characterized by an active output terminal and a grounded output terminal comprising in combination:
   a diode connected between said active output terminal of said power supply and a torch connection terminal;
   selectively operable power supply means, having an input connected to said active output terminal and said grounded output terminal and thereby powered by said welding power supply, for providing a high voltage output signal between said grounded terminal and said torch connection terminal;
   arc detection means operatively connected to said active output terminal for providing an arc signal in response to detection of an arc being struck between a torch connected to said torch connection terminal and a workpiece connected to said grounded terminal; and
   shunting means for shunting said diode and carrying arc current in response to said arc signal.

2. An improved arc starter as recited in claim 1 wherein:
   said arc detection means includes a rectifier whereby said arc detection means may be used when said welding power supply has an AC voltage output.

3. An improved arc starter as recited in claim 1 wherein:
   said arc detection means comprises a relay having a coil connected between said grounded terminal and said active output terminal and at least one voltage dropping device in series with said coil.

4. An improved arc starter as recited in claim 1 wherein:
   said arc detection means comprises a solenoid; and
   said shunting means comprises a switch having a contact pair for effecting said shunting of said diode, said switch being operated by said solenoid.

5. An improved arc starter as recited in claim 1 wherein:

said arc detection means comprises a relay having a coil connected between said grounded terminal and said active output terminal and at least one voltage dropping device in series with said coil, and at least one terminal set which provides said arc signal when said terminal set is in a predetermined state;

said shunting means comprises a solenoid operated switch having a solenoid coil operatively connected between said active output terminal and said grounded terminal and operatively connected to said terminal set so that said solenoid switch operates to shunt said diode in response to said terminal set being in said predetermined state.

6. An improved arc starter as recited in claim 1 wherein:

said diode is a 150 ampere switching diode.

7. The improved arc starter of claim 1 wherein said diode has a reverse breakdown voltage which is less than said high voltage output signal.

8. An improved arc starter for use with a welding power supply of the type characterized by an active output terminal and a grounded output terminal comprising in combination:

selectively operable power supply means, having an input connected to said active output terminal and said grounded output terminal and thereby powered by said welding power supply, for providing a high voltage output signal between said grounded terminal and a torch connection terminal;

a diode connected between said active output terminal of said power supply and said torch connection terminal so that said diode becomes reversed biased when said selectively operable power supply means is activated;

arc detection means comprising a relay having a coil connected between said grounded terminal and said active output terminal so that said coil is deactivated in response to a voltage drop between said grounded terminal and said active output terminal when an arc is struck, and at least one terminal set which provides an arc signal when said terminal set is in a predetermined state corresponding to said coil being deactivated; and shunting means comprising a solenoid operated switch having a solenoid coil operatively connected between said active output terminal and said grounded terminal and operatively connected to said terminal set so that said solenoid switch operates to shunt said diode in response to said terminal set being in said predetermined state.

9. An improved arc starter as recited in claim 8 wherein:

said diode is a 150 ampere switching diode.

10. The improved arc starter of claim 8 wherein said diode has a reverse breakdown voltage which is less than said high voltage output signal.

* * * * *